Patented July 22, 1924.

1,502,563

UNITED STATES PATENT OFFICE.

WILFRID PAUL HEATH, OF CHICAGO, ILLINOIS.

PROCESS OF BREAD MAKING.

No Drawing. Application filed April 29, 1922. Serial No. 557,379.

*To all whom it may concern:*

Be it known that I, WILFRID PAUL HEATH, a citizen of the United States, resident of Chicago, in the county of Cook and State of Illinois, have invented certain new and useful Improvements in Processes of Bread Making, of which the following is a specification.

In the process of making bread, it has heretofore been the practice to agitate the bread materials in a partially closed container with free access of air. In this agitation process microscopic bubbles of air are incorporated within the dough so that as the yeast cells begin to multiply and form their microscopic bubbles of carbon dioxide, there is always in bread so made bubbles of air and bubbles of carbon dioxide (each within their own respective cells) side by side within the dough mass. Since volatile flavors and vitamines quickly oxidize, resulting in a flavor deterioration and loss of nutritional value, it is highly desirable to keep the microscopic bubbles of air from getting within the dough material. This I accomplish by making a bread with homogeneous bubbles within its mass, a portion of the bubbles being incorporated during the beating process, and the yeast cells introducing their bubbles, of the same atmosphere, later during the process of fermentation.

To accomplish this, I conduct to the bottom of the bread material contained in a suitable mixing chamber, carbon dioxide, from drums under pressure, and drive the lighter air out through the top of the bread mixing chamber by forcing the carbon dioxide up from the bottom until the lighter air has been forced out through an opening at the top. This opening is then closed and the materials are agitated in the sterile non-oxidizing atmosphere, free from atmospheric dust and dirt. In the process of agitation the bubbles of this pure atmosphere, instead of air, are incorporated within the food mass so that later when the fermentation process forms its bubbles of carbon dioxide, the resulting bread has the same homogeneous gas throughout all its cellular structure.

Bread thus produced is much superior to bread the materials of which are mixed in the ordinary manner with free access of air thereto.

I claim as my invention:

1. In the manufacture of bread, the process of controlling the atmospheric bubble content thereof, consisting in agitating the bread materials in an atmosphere of carbon dioxide, and thereafter producing with yeast, in the same material, a fermentation process, thereby forming a bread or bakery product having a homogeneous atmosphere in all its bubbles.

2. In the manufacture of bread, the process of controlling the atmospheric bubble content thereof, consisting in agitating the bread materials including yeast, in an atmosphere of carbon dioxide, thereby forming a bread or bakery product having a homogeneous atmosphere in all its bubbles, produced partly by the yeast fermentation and partly by carbon dioxide forced into the bread mixture.

3. In the manufacture of bread, the step which consists in substituting for the incorporated bubbles of air within the dough mass including yeast, a sterile atmosphere of carbon dioxide or similar material, thereby preventing the oxidation of volatile flavors and vitamines.

4. The process of controlling the atmospheric bubble content of bread by agitating the bread materials including yeast in an atmosphere of carbon dioxide so that the subsequent fermentation process with the yeast will result in a bread or bakery product having a homogeneous atmosphere in all its bubbles.

5. In the art of making bread, the step which consists in forcing into the lower part of a mixture of dough material including yeast, while held in a suitable mixing chamber, carbon dioxide under pressure, and thereby expelling the air from the dough mixture, and incorporating the carbon dioxide in said mixture then allowing the yeast to ferment to add other carbon dioxide to the dough mixture.

6. In the art of making bread, the step which consists in forcing into a dough mixture containing yeast carbon dioxide under pressure, and thereby expelling the air from the dough mixture, whereby the gas produced by the fermentation of the yeast and that supplied to the mixture, constitute a homogeneous atmosphere through the dough mixture.

7. In the art of making bread, forcing into a dough mixture containing yeast, while held in a suitable mixing chamber, carbon dioxide under pressure, thereby expelling the air from said mixture, and incorporating the carbon dioxide therewith, whereby the gas produced by fermentation of the yeast and that supplied to the mixture constitute a homogeneous atmosphere throughout said mixture.

In witness whereof, I have hereunto set my hand this 20th day of April, 1922.

WILFRID PAUL HEATH.